United States Patent [19]
White

[11] 3,943,910
[45] Mar. 16, 1976

[54] GAS BROILER

[76] Inventor: Lyall B. White, 1408 Jacobson Circle, Sun City Center, Fla. 33570

[22] Filed: Nov. 11, 1974

[21] Appl. No.: 522,596

[52] U.S. Cl. ................. 126/41 R; 99/409; 426/523
[51] Int. Cl.² .......................................... F24C 3/08
[58] Field of Search ............. 126/41 R, 41 B, 41 C; 99/409, 443 R, 443 C; 426/523

[56] References Cited
UNITED STATES PATENTS

| | | | |
|---|---|---|---|
| 3,257,935 | 6/1966 | Temperato | 99/443 R |
| 3,483,815 | 12/1969 | Turrel | 99/409 |

*Primary Examiner*—Edward G. Favors
*Attorney, Agent, or Firm*—Burd, Braddock & Bartz

[57] ABSTRACT

Steaks, chops, hamburger patties or other meat to be broiled is reciprocated on a reciprocating grill transversely of a pair of elongated spaced apart horizontally disposed upper heat sources in such a manner that each of spaced apart outer ends of the meat to be broiled reaches the limit of its movement toward the elongated heat sources when it is in closest relationship to the heat source nearest to it. Power means are provided for reciprocating the grill in such a manner that heat input is substantially uniform over the entire area of the meat. A horizontal elongated heat source is provided below the grill in parallel relation to the upper heat sources an equal distance from each. The meat can be positioned on the grill on a platter, or sheet having upturned edges to retain the juices therein. The upper elongated heat sources are constituted as downwardly firing gas burners having cooking flames supplied from a relatively high pressure gas-air mixture and kindling flames supplied from a lower pressure gas-air mixture. The kindling flames burn at the base of each cooking flame and serve to kindle and maintain such cooking flame.

33 Claims, 7 Drawing Figures

GAS BROILER

BACKGROUND OF THE INVENTION:

This invention has relation to a gas fired broiler which can consistently produce broiled steaks and the like to minutely controlled specifications as to the amount of char or searing and as to the degree of doneness throughout. The invention also has to do with a down firing gas burner useful to produce such steaks.

It is known to broil meat such as hamburgers between upper and lower gas fired burners. See U.S. Pat. No. 3,604,336 to D. E. Straub, granted Sept. 14, 1971 and U.S. Pat. No. 3,580,164 to E. D. Baker, granted May 25, 1971. These patents show the passing of meat to be broiled along an endless one way conveyor belt. They aford no opportunity for varying the flavor and cooking from piece to piece of the finished product. In fact, uniformity of cooking of the finished product is a major attribute or claim of these patents. Furthermore, where a straight Bunsen burner action is relied upon from the upper burner, that burner has to be positioned so close to the meat that excessive spattering occurs on the burner, and, in numerous instances, the setting is so close that any substantial non-uniformity in the thickness of the product being broiled results in the burner actually touching the top of the product. See U.S. Pat. No. 3,604,336, column 5, lines 10 through 15.

Attempts to elongate the downward flame by increasing pressure of the gas-air mixture result in flame-out due to mixture exceeding a velocity beyond which the flame can cling to the burner.

Downfiring gas burners are used to heat a ceramic plate to radiance. This forms a relatively very slowly controlled heat source, which is incapable of creating anything but one uniformly broiled piece of food after another. See U.S. Pat. No. 3,580,164, column 2, lines 47 through 52 and lines 59 through 65. Such an upper radiant heater must be even more closely spaced to an upper food surface to obtain comparable heating.

It has been suggested to control the heating and cooking of cheese sandwiches, hamburgers, french toast, bacon, pancakes, and the like as they pass along a one-way conveyor between a pair of heat sources by raising and lowering the upper source with respect to the food on the conveyor. See U.S. Pat. No. 3,646,880 to J. D. Norris, granted Mar. 7, 1972. Once this adjustment has been made it is maintained as long as units of a particular uniform product are passing on through the broiler. This vertical adjustment is not useful to vary the cooking and flavor attributes of individual single pieces of steak or the like.

BRIEF SUMMARY OF THE INVENTION

Two elongated, parallel, spaced apart, downwardly delivering upper heat sources are positioned above a reciprocating support for food to be broiled, this support being capable of moving the food back and forth underneath of the heat sources from a first limit position where a first end of the food is in vertical alignment underneath a first of said heat sources and a second of said heat sources is in overlying relation to the food to a second limit position where a second opposite end of the food is in vertical alignment beneath the second heat source and said first heat source is positioned over the food. Means are provided to reciprocate the food at such a rate that the heat input over the upper surface of the food is substantially uniform.

In the form of the invention as shown, the food to be broiled is situated on a plate which has turned up edges to conserve any juices cooking from the food.

An elongated heat source is situated beneath the reciprocating support, is in parallel relation to the upper heat sources and is spaced an equal distance from each of them.

In the form of the invention as shown, a pair of downwardly firing gas fired burners constitute the two upper heat sources. Each burner includes an inner cooking flame tube provided with a plurality of downwardly opening orifices, this tube being provided with a gas-air mixture under relatively high pressure. As shown herein, an outer kindling flame tube surrounds the cooking flame tube and is provided with orifices opening to the outer ends of the cooking flame orifices. This kindling flame tube is supplied with a gas-air mixture under a relatively lower pressure.

In the form of the invention as shown, a narrow slot is open along the kindling flame tube past each kindling orifice and extending to the vicinity of a pilot light. Gas-air mixture passing this slot provides a ribbon of ignition flame which ignites each of the kindling flames.

Means is provided for varying the vertical relationship of the upper flames and burners and the lower flames and burner with respect to the food to be cooked on the grill.

Timers are provided to preset the amount of time that heat will be supplied by the upper heat sources, the amount of time that heat is supplied by the lower burner and to control the main gas pipe, the reciprocating means, and an air pressure blower.

Safety devices of any usual or preferred design cut off the supply of all gas to the broiler should a malfunction occur.

DESCRIPTION OF PREFERRED EMBODIMENT:

A gas broiler 10 includes a platform 12 having legs (not shown) resting on a floor and having a horizontal table top 14 made of wood or other suitable material. A grill track frame 16 is supported on integral legs 18 as at 20 on table top 14. Frame 16 consists of two symmetrical halves each of which include an inwardly facing channel-shaped grill track 22.

A horizontal, elongated, upwardly firing, heat source such as a Bunsen-type lower burner 24 is supported with respect to the frame 16 by plates 26 which are integral with tracks 22 and are provided with slots 28. Lower burner support plates 30 are fixedly mounted with respect to lower burner 24 and are equipped with butterfly nuts and bolts 31 fastened to plates 30 and sliding in the slot 28 of plates 26 so that the vertical height of the burner 24 above the table top 14 can be adjusted. An upper heat source support frame 32 is threadably mounted at each of its outer ends into threaded height adjusting legs 34, 34. These legs are rotatably mounted in upper heat source support frame studs 36 which are integral with and extend upwardly from upper surfaces of each of the grill tracks 22. Two elongated, spaced apart, horizontally disposed, upper heaters 38, 38 constitute an upper heat source and are mounted integrally with the upper heat source support frame 32 as best seen in FIG. 1.

Figure 1:
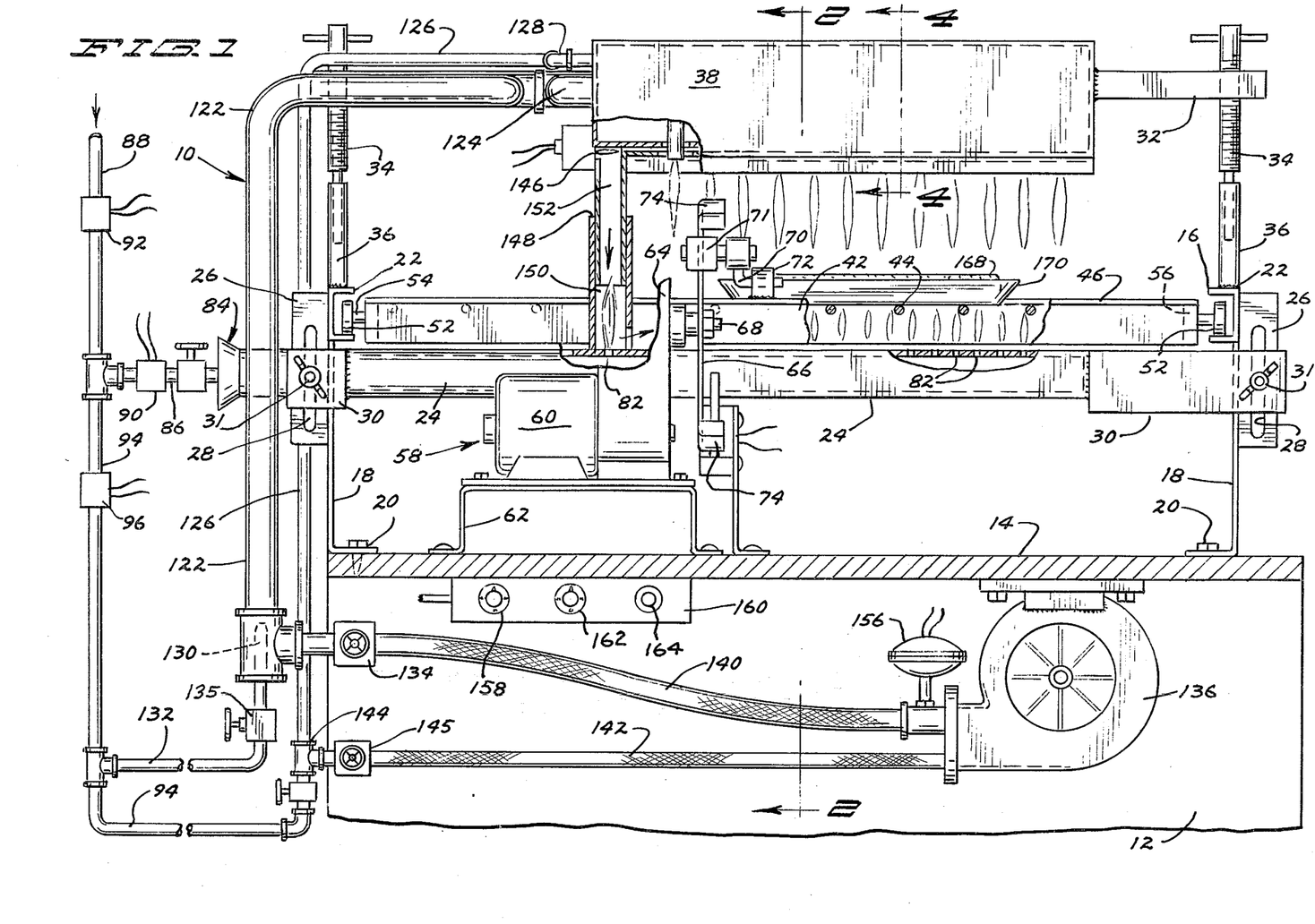
FIG. 1 is a front elevational view of a broiler made according to the present invention.
Figures 2, 3:
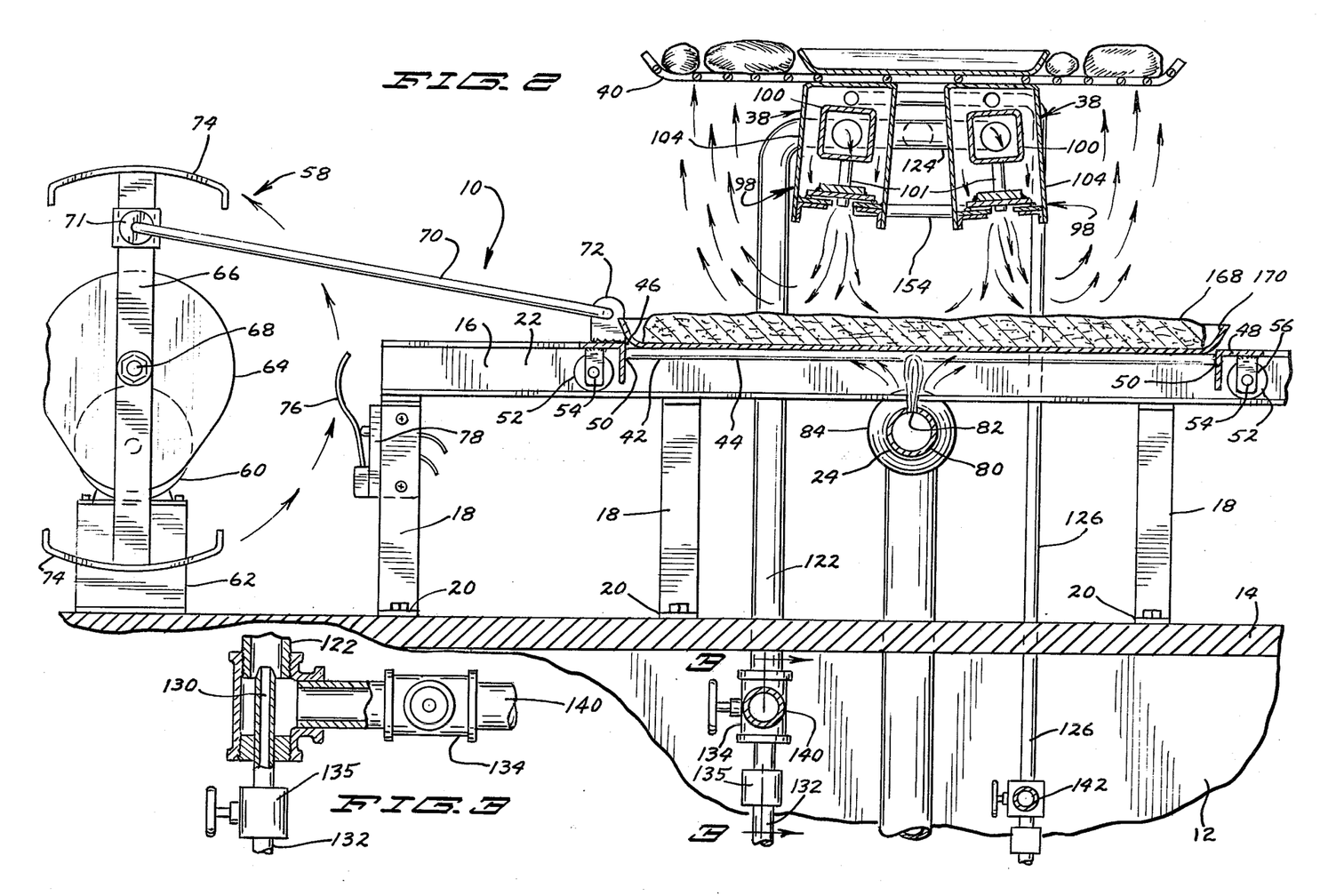
FIG. 2 is a vertical sectional view taken on the line 2—2 in FIG. 1.
FIG. 3 is a vertical sectional view taken on the line 3—3 in FIG. 2.
Figures 4, 5:
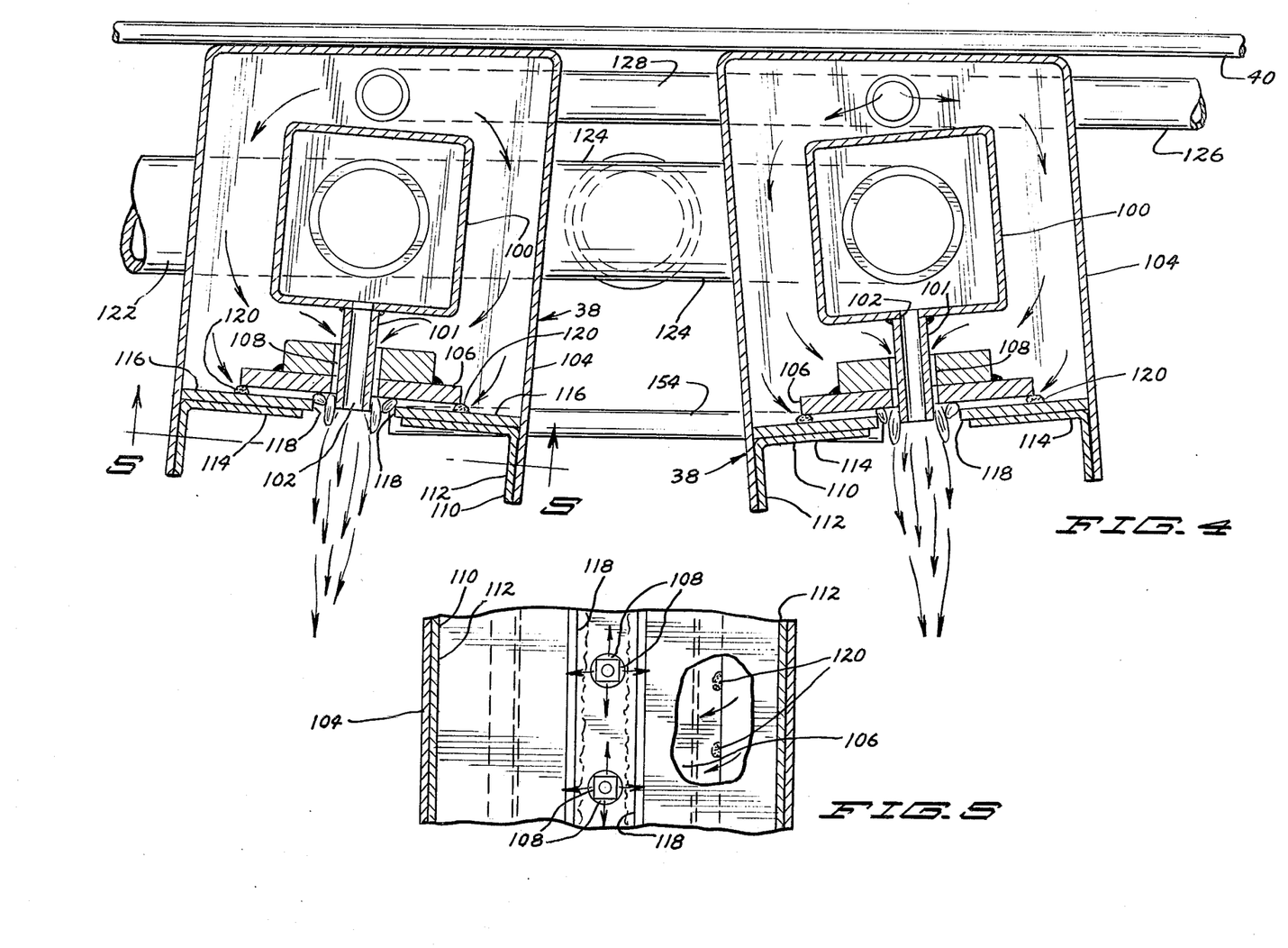
FIG. 4 is a vertical sectional view taken on the line 4—4 in FIG. 4.
FIG. 5 is a fragmentary, substantially horizontal, sectional view taken on the line 5—5 in FIG. 4.
Figure 6:
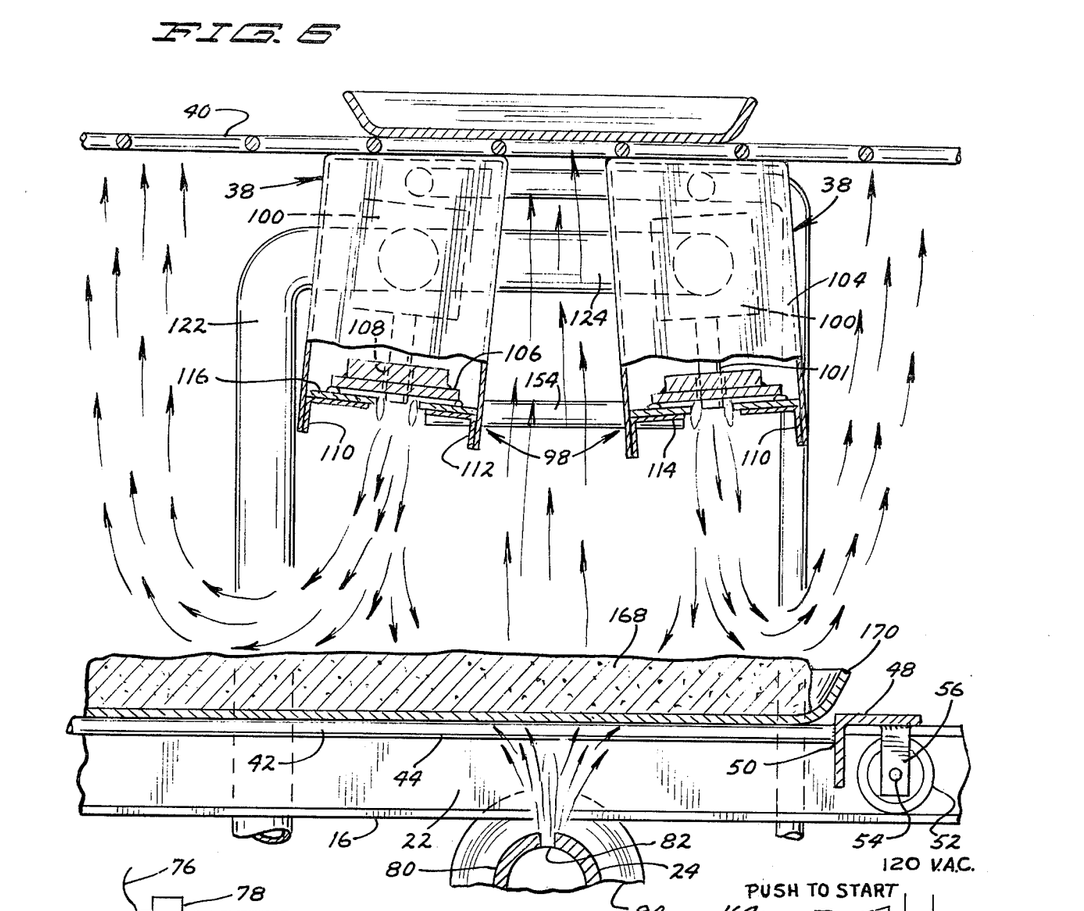
FIG. 6 is an enlarged fragmentary vertical sectional view also taken on the line 2—2 in FIG. 1.

The details of construction of the plates 26 and 30 and of the height adjusting legs 34 and studs 36 are omitted from the disclosures of FIGS. 2, 4 and 6 for clarity of illustration; while a pervious warming or holding tray 40 has been omitted from FIG. 1 but is disclosed on top of the upper heat sources 38, 38 in FIGS. 2, 4 and 6.

A rectangular grill 42 includes spaced apart parallel bars 44 integrally connected to drive angle iron 46 and outer angle iron 48 as at 50. Grill support wheels 52 are rotatably mounted as at 54 on straps 56 which depend from upper legs of each of the angle irons 46 and 48. These wheels 52 support the grill 42 on an interior horizontal surface of a lower horizontal leg of each of the grill tracks 22, as best seen in FIG. 1. This leaves the grill free to reciprocate back and forth between the upper heat sources 38, 38 and the lower heat source 24.

This reciprocation is accomplished by a reciprocating drive mechanism 58 which is best seen in FIG. 2. It includes a reciprocating drive motor 60 which is mounted on a stand 62 on table top 14, a gear box and gear casing 64 integral with the motor casing and extending upwardly therefrom, a grill drive bar 66 rotatably mounted on driven axle 68 which extends outwardly from gear box 64, grill drive linkage 70 rotatably mounted in a grill drive linkage mounting fitting for adjustable positioning along drive bar 66, and grill drive tab 72 integral with and extending upwardly from a central portion of drive angle iron 46 of the grill 42. Drive linkage 70 is pivotally mounted with respect to the drive tab 72.

On opposite ends of grill drive bar 66 are integrally positioned motor speed-up cams 74, 74, operably aligned with switch arm 76 of a normally open micro switch 78 in position to close that micro switch when either of the cams 74 is in touch with the switch arm 76. This is for a purpose to be discussed later.

As best seen in FIG. 1, the lower heat source 24 includes an elongated burner body 80 having a plurality of vertical upwardly opening orifices 82 therein. A gas venturi, air-intake section 84 which can be of any usual or preferred construction and is fed by a lower burner gas supply line 86 connected to a gas main 88. A lower burner solenoid valve 90 is situated in lower burner supply line 86, and a master gas solenoid valve 92 is situated in gas main 88 between the source of gas supply (not shown) and lower burner gas supply line 86.

Upper heat sources 38, 38 also receive their gas from gas main 88 connected to an upper burner gas supply line 94, flow through which is controlled by an upper burner solenoid valve 96 located therein. Each of the upper heat sources 38 is similar to the other, so a description of one will actually be a description of both. In the form of the invention as shown, each upper heat source 38 is constituted as a downwardly firing upper gas burner 98, each such burner including an elongated inner cooking flame tube 100 provided with a plurality of vertically downwardly extending cooking flame pipes 101, each having a downwardly opening cooking flame orifice 102 open therethrough. It is an important feature of the invention that sufficient gas-air mixture is supplied to this cooking flame tube 100 so that the cooking flames formed by the burning of this fuel as it leaves cooking flame orifices 102 will carry down into contact with the meat or other food which is being broiled after it has been situated on the reciprocating rectangular grill 42. The difficulty and impossibility of this accomplishment before the present invention concerned the fact that an air-gas mixture leaving the cooking orifices 102 under sufficient pressure to accomplish the above could not sustain a flame. It exceeded a "blow out" velocity. To render the cooking flames stable, kindling flames have been provided at four points around the base of each cooking plane orifice 102. This is accomplished by providing an elongated outer kindling flame tube 104 in surrounding relation to cooking flame tube 100. An elongated central metal strip 106 closes off the lowermost surface of the interior of the kindling flame tube 104 and this strip is provided with a plurality of orifices 108 each concentric with one of the cooking flame pipes 101 but in spaced relation thereto. Angle irons 110, 110 extend in spaced, parallel relation to the strip 106 and extend outwardly therefrom and are provided with generally vertically downwardly extending legs 112, 112 and horizontally inwardly extending legs 114, 114. In sealing relationship to horizontal upper legs 114, 114 are parallel spaced apart, generally horizontal plates 116, 116, the spaced apart parallel facing edges 118 of which are spaced back from the outermost edges of the kindling flame orifices 108.

It is to be noted that the central elongated metal strip 106 does tend to combine with horizontal plates 116, 116 to close off the bottom of the kindling flame tube 104, but that the metal strip 106 is actually in slightly clearing relationship with respect to the plates 116, 116, being held in that relationship by spaced apart tack welds 120. Thus there is purposely some "leakage" of gas-air mixture between the elongated central metal strip 106 and the generally horizontal metal plates 116, 116, for a purpose to be described later. In the drawings, and particularly in FIG. 4, the size of this "leakage" space has been over emphasized for clarity of illustration.

The supply of gas-air mixture to the cooking flame tube 100 and to the kindling flame tube 104 is perhaps best seen in FIGS. 1 and 3. A cooking flame supply pipe 122 includes a header 124 which is open to both cooking flame tubes 100 of each of the downwardly firing gas burners 98. A kindling flame supply pipe 126 includes a header 128 which is open to each of the kindling flame tubes 104.

As best seen in FIG. 3, a cooking gas venturi tube 130 is connected to a cooking gas supply line 132 which receives its gas from its connection with upper burner gas supply line 94. The venturi action of gas flowing from venturi 130 causes a reduction of pressure which tends to draw air into the cooking flame supply pipe 122 from a flexible air tube 140. Should the pressure of gas in the cooking gas supply line 132 be sufficient, sufficient air could be drawn in through the tube 140 from the atmosphere. However, gas pressure in the gas main 88 and in the cooking gas supply line 132 sufficient to entrain enough air into the cooking flame supply pipe 122 to get proper combustion will be in excess of pressures considered safe for use within buildings. Thus the use of high pressure gas will be limited to use of the broiler of the invention in outside locations where the dangers would be minimized and where the safety requirements could be met using such high pressure gas.

For use inside of a building, then, it is necessary to provide an additional source of air under pressure. This is done by providing a centrifugal blower 136 driven by blower motor 138. As best seen in FIGS. 1 and 3, the flexible air tube 140 introduces air from the blower to the area adjacent the venturi 130 to the end that a relatively high pressure gas-air mixture passes along cooking flame supply pipe 122 and into the cooking flame tube 100. The proportion of air to gas is regulated by a cooking air control valve 134 in air tube 140 in the form of the invention as shown; although this could be replaced with a fitting with a fixed orifice therein. This air valve 134 and/or a valve 135 in 132 can also be used the length of cooking flame fed from orifices 102.

In order to obtain the proper gas-air mixture in the kindling flame tube 104, a portion of the air from the centrifugal blower 136 is fed through a flexible air tube 142 to a similar or suitable venturi-air intake fitting 144 which mixes this air with the gas from the upper burner gas supply line 94, this mixture being carried along the kindling flame supply pipe 126 to each of the kindling flame tubes 104. A kindling air control valve 145 in air tube 142 regulates the proportion of air to gas in kindling flame supply pipe 126.

In order to kindle the flames in the lower burner and in both of the upper burners, a pilot light 146 is situated on one end of one of the gas burners 98 is position to ignite gas-air mixture coming through the space between strip 106 and one of the plates 116. Telescoping vertical flash tube 148 has a bottom portion 150 fixedly mounted on lower burner 24 to receive gas-air mixture from at least one of the vertical orifices 82. A top portion 152 of the telescoping flash tube 148 is fixedly mounted to said gas burner 98 to be directly below pilot light 146. See FIG. 1.

When the pilot light 146 is lit and gas-air mixture is available to both the cooking tube and kindling tube above and the burner below, the gas-air mixture passing upwardly from the lower burner through vertical flash tube 148 will be ignited by the pilot light as the pilot light also ignites a long ribbon of flame along the line where the gas-air mixture passes out between the strip 106 and one of the plates 116. This will instantaneously ignite the four separate kindling flames around each cooking flame orifice 102, will ignite the cooking flame, and in turn these kindling flames will ignite the ribbon on the other side of the burner causing it to stretch from end to end of the upper burner 98.

A horizontal flash tube 154 having a longitudinally downwardly opening slit therealong is fixedly mounted to one end of each strip of the burners 98, and the unburned gases from between the strip 106 and a plate 116 of the unignited burner 98 will flow through the horizontal flash tube 154, be ignited by pilot light 146, and will thus flash back to cause that unlighted burner to be lighted.

Should the centrifugal blower 136 fail to operate, or should it operate at reduced air pressure, the action of the venturis which open to supply pipes 122 and 126 will be to draw in sufficient air through air tubes 140 and 142 and through the inlet opening in that centrifugal blower so that combustion will take place. The flame thus ensuing will not be flame which is desirable in broiler, for example, but it will burn off any gas coming off of the burners so that unburned gases are not discharged in and around the broiler.

However, in order to insure that no gas is supplied to the upper burners 98, 98 without a supply of air under pressure from the centrifugal blower 136, a normally open, diaphragm operated, switch 156 is provided in position where the diaphragm is open to air pressure from the blower 136.

A first upper burner timer 158 is provided in a control box 160 which, as shown, is mounted under the table top 14; and a second lower burner timer 162 is also located in that control box. A two gang, "Push to Start" switch 164 is also mounted in control box 160 and the control knobs for all three of these switches protrude through the box to be readily available to the operator of the broiler. In the form of the invention shown, the operation of the reciprocating drive motor 60, and the master gas and lower burner solenoid valves as well as the operation of the centrifugal blower and blower motor 138 are all controlled by the second timer 162; although it is recognized that a third timer could be provided to handle all of the above functions except that of the lower burner solenoid valve. The action of these various elements and of the other elements of the broiler will be explained in connection with the following disclosure of the operation of the broiler.

OPERATION

A piece of steak 168, chops, hamburger patties, or other meat to be broiled is placed on a "sizzle" platter 170, on a piece of aluminum foil with upturned edges, or on any other suitable pan, and, with the grill drive bar 66 in vertical position as seen in FIG. 2, the meat and pan are centered symmetrically beneath the upper heat sources 38, 38. The grill drive bar 66 is then rotated in counterclockwise direction to move fitting 71 to horizontal relationship with respect to the driven axle 68, and the positioning of grill drive linkage mounting fitting 71 along the grill drive bar 66 is adjusted so that the right end of the meat will lie substantially directly under the output from the downwardly firing gas burner 98 located to the right in FIG. 6. Fitting 71 is then fastened in that position to drive bar 66 by any usual or desired means. Once this adjustment has been made, the grill drive bar can be rotated through 180°, thus positioning the fitting 71 in horizontal relationship with respect to driven axle 68 but at the right side thereof as viewed in FIG. 2. This will automatically position the left end of the steak 168 substantially directly under the cooking flame from the downwardly firing gas burner to the left in FIG. 6. Working from experience, the broiler operator will adjust the vertical relationship between lower burner 80 and the grill 42 if necessary by loosening butterfly nuts and bolts 31, adjusting the height of the lower burner 24, and again tightening the butterflies 31. Should experience dictate that a change should be made in the vertical relationship of the downwardly firing gas burners 98 with respect to the upper surface of the steak 168, this is accomplished by turning the handles on adjusting legs 34.

In general, if a relatively large degree of "sear" is desired with a relatively rare center, the burners will be brought closer to the meat and/or the length of the cooking flame will be extended. If the meat is to be well done but not to have much of a sear, the upper burners will be spaced at relatively greater distances than the lower burner and/or the length of the cooking flame reduced. Likewise, in order to obtain low sear, the heat and flame action from the upper burner can be cut off before the cooking is finished using the lower burner. Experience with the broiler will allow a user to learn rapidly the optimum burner height and flame settings, as well as the optimum cooking times for the upper burner and for the lower burner, depending on the nature and size of the meat, the thickness of the meat, and the individual preference of his "customers."

Based on this experience, the first upper burner timer 158 will next be set to predetermine the time that downwardly directing cooking flame wil be directed against the reciprocating meat; and the second lower burner timer 162 will be set to predetermine the time that the lower burner will be activated. Since, in the usual case, the lower burner will be operated longer than the upper burner, in the form of the invention as shown, all of the controls turning off all of the functions of the broiler except the gas mixture to the upper burners is controlled by the second lower burner timer 162.

Figure 7:
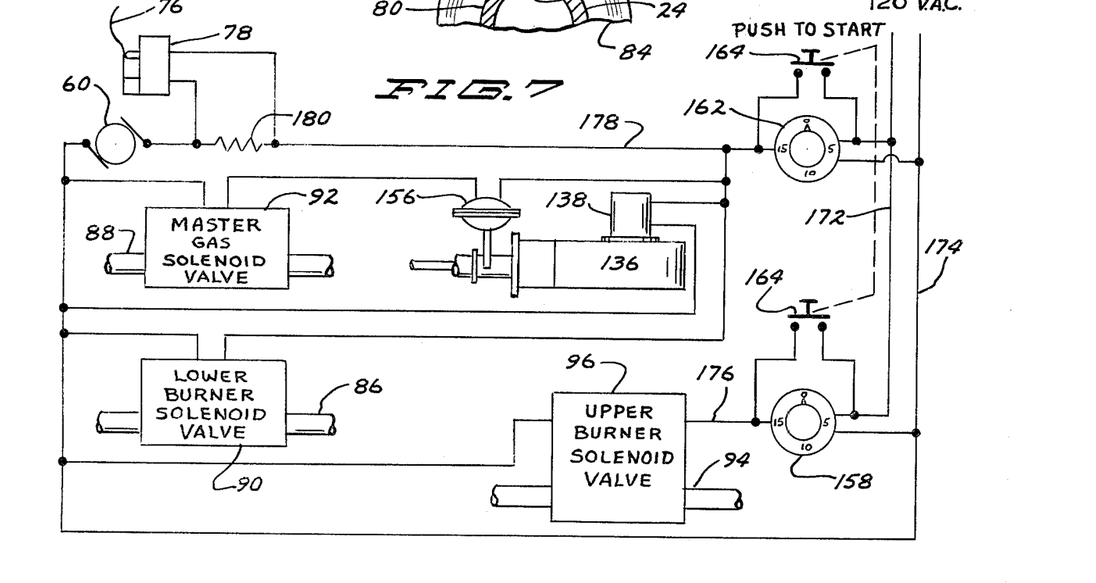
FIG. 7 is a diagrammatic and schematic representation of one form of electrical circuitry which will be useful in operating the illustrated version of the broiler of the invention.

Now the broiler is ready to operate, and, as best seen in FIG. 7, depression of the "Push to Start" switch 164 will put both timers into action, closing the circuit between a "hot" electrical power input line 172 through the timing mechanisms and back to a "ground" electrical power input line 174 in each of the timers 158 and 162. Activation of upper burner timer 158 by the "Push to Start" switch 164 causes the hot line 172 to be connected to an upper burner solenoid line 176, and through the upper burner solenoid 96 to the ground line 174. This opens the valve 96, and allows passage of any gas reaching upper burner gas supply line 94 to pass to the upper burner.

Activation of lower burner timer 162 by the Push to Start switch 164 connects the hot line 172 to a controls hot line 178. This activates reciprocating drive motor 60 through a reciprocating drive motor armature resistor 180 at a first, relatively slower speed. Also activated is blower motor 138, causing centrifugal blower 136 to deliver air pressure into the air tubes 140 and 142. This causes the normally open diaphragm operated switch 156 to close, activating master gas solenoid valve 92 to an open condition whereby gas can pass through that valve along the gas main 88.

Also activated by Push to Start switch 164 and continued in activation by lower burner timer 162 is lower burner solenoid valve 90.

Thus all three solenoid valves are open and air pressure is available from the blower 136, so the burners will ignite and burn in the manner set out above, and heat will be directed to the steak 168 moving, as it is, on the reciprocating grill 42. When the preset time on timer 158 has elapsed, power to upper burner solenoid line 176 will be interrupted, and the upper burner solenoid valve 96 will be closed, cutting off gas supply to the upper burners 98, 98. Since the centrifugal blower 136 is still operating, air will continue to be supplied through the burners 98,98 and any residual gas will be purged and burned.

It is to be noted that even if the cutoff of gas was occasioned by the closing of master gas solenoid valve 92 because of the end of the timing cycle or because of some malfunction in the system and its operation, the momentum of the centrifugal blower 136 and of the motor 138 will be such that there will be a continuation of flow of air through the lower burners sufficient to purge all of the gas from the lines, thus eliminating any possibility whatever of a gassy taste developing on the product. The air velocity during the purging is sufficient so as to prevent flashback.

In normal operation, however, after the time has come when it is desired to removed further heat from the upper burners, next the time will come when the lower burner is to shut down, and timer 162 will then interrupt the power to controls hot line 178, thus simultaneously shutting down reciprocating drive motor 60, and the movement of the reciprocating grill occasioned thereby; the master gas solenoid valve, and the lower burner solenoid valve; as well as the centrifugal blower 136. The piece of steak 168, and the sizzle platter 170, can then be removed and served, or the steak can be turned over and the process repeated to obtain a controlled sear on the "flip side" of the steak if that should be desired.

If the reciprocating drive motor 60 were to operate at a constant speed throughout a 360° revolution of the grill drive bar 66, the relatively slow movements of the grill toward the ends of each stroke would occasion an excess of heat input to the ends of the piece of steak 168. For that reason, the drive of the reciprocating grill is such that its speed from beginning to end is relatively uniform. One way of accomplishing that is illustrated herein. The cams 74, 74 provided at either end of the grill drive bar 66 are in position to come into contact with the switch arm 76 of the normally open micro switch 78. When this occurs, the micro switch 78 shorts out the armature resistor 180 and thus causes a speed up of the reciprocating drive motor 60 until such time as the switch arm 76 moves clear of the cam 74, and the micro switch 78 once again opens. The drive during this central portion of the stroke is at the relatively slow speed again until the cam 74 at the opposite end of the grill drive bar 66 causes the micro switch 78 to close. Other means of obtaining a substantially uniform drive could be utilized.

As best illustrated in FIG. 6, a great share of the success of the broiler of the present invention is the ability to extend the flame from the gas burner down to where it impinges on the surface of the steak or meat product being broiled. The force of the gas flame from the top forces more intimate contact with the valleys as well as the hills of the surface of the meat, and heat transfer throughout the meat is much greater.

This result has been accomplished previously but with flames from the underside of the meat. However, the very act of putting the hot searing flame right against the meat from the bottom has caused an instantaneous melting of the juices and fats in the meat and the loss of those juices and fats down toward or through the flame. This results in some burning of these fats and juices, the production of soot and smoke and carcinogenesis particles some of which are carried back up and impair the flavor and wholesomeness of the broiled product.

Because of the length of the downward flame coming from the upper burners 98 and the resulting large distance between those burners and the steak, any mean particles or fat or juices the "sizzle" or spatter upwardly will fall again to the surface of the meat without impinging on the hot burner. Any smoke that is formed passes harmlessly up and away, being carried up by the heat of the burners to position harmlessly away from the finished product.

In Bunsen-type burners formerly available for cooking from the top, the spatter of the meat would often cause difficulty and actually clogging the holes of the relatively close burner. This is also eliminated by the greater distance between the burner and the meat being broiled.

As perhaps most clearly seen in FIG. 1, the meat tray and meat product will often be narrower than the elongated upper burners and lower burner. Thus the heat from the lower burner does not all impinge on the underside of the meat product or its platter. A substantial portion of this heat passes upwardly past the narrow width of the platter. As best seen in FIG. 6, the spacing between the burners 98, 98 allows the direct heat from the lower burner to pass up to position where food products being cooked or warmed can benefit from this heat.

Similarly, it is to be noted that the burners 98, 98 are each tilted slightly outwardly away from each other so that heat impinging on the steak "bounches" or reflects off upwardly and to areas outside of the burners. If the burners were in a straight vertical position, much of this heat would be reflected back into the burners, thus unduly heating them and substantially shortening their useful life. Absence of direct or reflected heat on the upper burners keeps them cooler and reduces the tendency to flashback.

While the elongated outer kindling flame tube 104 is shown as being in surrounding relation to the inner cooking flame tube 100, and is shown as being fed by a kindling flame supply pipe 126 and a header 128 from a separate source of air under pressure in air tube 142 and from a separate upper burner gas supply line; it is to be understood that there are other effective ways of providing relatively lowr pressure gas-air mixtures to the kindling flame orifices 108. For example, the kindling flame supply pipe and header can be completely eliminated, and relatively tiny orifices or "bleed holes" can be provided from the interior of the cooking flame tube 100 into the kindling flame tube 104, thus to provide substanially lower pressure in the kindling flame tube and to the kindling flame orifices 108. Using this arrangement, the size and positioning of the kindling flame tube can be greatly changed without substantially affecting the operation of the downwardly firing upper burners.

As best seen in FIGS. 5 and 6, the high pressure cooking flames can extend downwardly from the burners without blowing out at the base because the relatively low pressure and highly stable kindling flames are impinging on each cooking flame around four sides thereof. It is to be understood that cooking flame orifices and kindling flame orifices can be so designed that one kindling flame is sufficient to keep one cooking flame ignited.

The presence of the constant ribbon of ignition flame running the entire length of the elongated upper burners 98 assures that should one or all or some of the kindling flames be momentarily extinguished for any reason, they will be instantaneously reignited by the ignition flame. While two ignition flames are shown on each burner, it is to be understood that a single ignition flame would suffice. Also, because of the stability of the kindling flames, a downwardly firing burner employing no special and constant ignition flame would also be effective.

It is to be noted that when the blower motor 138 is first activated, it takes some time for it and the centrifugal blower 136 to get up to full speed, even after sufficient pressure has been generated to operate the diaphragm operated switch 156. This results in the first gas-air mixture which reaches the burners being substantially "gas rich." This means that the mixture will ignite much more easily than the ultimate mixture. The upper burners, for example, will light from end to end almost instantly and this reduces the momentary expulsion of unburned mixture into the room.

Throughout this specification, the grill has been shown to reciprocate and the burners to remain fixed except for the ability to adjust the burners vertically. Early experience with the present invention has shown that equally effective results can be obtained as far as the broiling of the meat is concerned by holding the grill and the meat stationary and reciprocating all three burners back and forth as a unit. Reciprocating the top burners while holding the bottom burner or burners in fixed relation with respect to the meat being broiled will also be effective.

The embodiments of the invention in which an exclusive property or privilege is claimed are defined as follows:

1. An apparatus for broiling a portion of food, said apparatus including a frame; an elongated, horizontal, downwardly delivering upper heat source having at least one elongated horizontal downwardly delivering heater supported on said frame; a grill for supporting a food portion to be broiled with respect to said frame and below said upper heat source; means adapted to reciprocate said upper heat souce with respect to said grill and said grill with respect to said upper heat source in a horizontal plane beneath said heat source and transversely of the longitudinal axis thereof in a manner to repeatedly bring all areas of a food portion on said grill into and out of vertical alignment beneath said heat source.

2. The apparatus of claim 1 and a lower, upwardly delivering, heat source supported on same frame below said grill in generally centered vertical relation with respect to and underneath said upper heat souce.

3. The apparatus of claim 1 wherein the heat source includes at least two such horizontal upper heaters in spaced parallel relation to each other; and wherein there is means adapted to cause the heat input from said heat source to a food portion to be relatively even over an entire upper surface area of said food portion, said means to cause even heat input including said means adapted to reciprocate said grill with respect to said upper burners.

4. The apparatus of claim 3 and an elongated, horizontal, upwardly delivering lower heat source supported on said frame below said grill in parallel relation to said upper heaters and equidistant from each.

5. The apparatus of claim 3 wherein said upper heaters are each constituted as downwardly firing upper gas burners.

6. The apparatus of claim 5;
  a. wherein said upper gas burners each include:
    1. a cooking flame tube having vertical, downwardly opening cooking flame orifices therethrough, and
    2. a kindling flame tube having downwardly opening kindling flame orifices therethrough;

b. said tubes being so arranged that said kindling flame orifices open to position immediately adjacent said cooking flame orifice openings;

c. means for supplying siad cooking flame tube with a combustible gas-air mixture under a pressure in excess of that at which flames fed by said cooking flame mixture through said cooking flame orifices can be sustained adjacent the cooking flame tube; and d. means for supplying said kindling flame tube with a combustible gas-air mixture under a pressure such that flames fed by said kindling flame mixture through said kindling flame orifices will be stable and will kindle a cooking flame at each cooking flame orifice.

7. The apparatus of claim 6 wherein said upper burners are vertically adjustably mounted on the frame in relation to the grill; and said lower burner is vertically adjustably mounted on the frame in relation to the grill.

8. The apparatus of claim 6 and means to ignite kindling flames at each kindling flame orifice.

9. The apparatus of claim 8 wherein said means to ignite includes:

a. a pilot light;

b. said kindling flame tube being provided with a continuous longitudinal ribbon flame slot open from the interior of said tube to position adjacent the opening of each of said kindling flame orifices from said kindling flame tube; and c. a flash tube positioned to carry gas-air mixture from outside said slot to said pilot light and to carry flame from said pilot light to outside said slot.

10. The apparatus of claim 8 and an elongated, horizontal, upwardly delivering lower heat source located below said grill in parallel relation to said upper burners and equidistant from each.

11. The apparatus of claim 10 wherein said lower heat source is constituted as an upwardly firing lower gas burner.

12. The apparatus of claim 11 and means to ignite said lower gas burner.

13. The apparatus of claim 6 wherein said means for supplying said cooking flame tube with a gas-air mixture includes:

a. an air pressure supply means;

b. a cooking gas supply line adapted to lead from a source of gas under pressure;

c. a cooking flame supply pipe open to said cooking flame tube;

d. an air tube open to a discharge outlet of said air supply means;

e. means for mixing gas from said supply line and air from said air tube and delivering it to said cooking flame tube through said supply pipe; and f. means to control the ratio of gas to air delivered into said supply pipe.

14. The apparatus of claim 13 wherein said means for supplying said kindling flame tube with a gas-air mixture includes means for utilizing a portion of the output of air from said air pressure supply means.

15. The apparatus of claim 8 wherein said means for supplying said cooking flame tube with a gas-air mixture includes:

a. an air pressure supply means;

b. a cooking gas supply line adapted to lead from a source of gas under pressure;

c. a cooking flame supply pipe open to said cooking flame tube;

d. a venturi tube on said cooking gas supply line and open into the cooking flame supply pipe;

e. an air tube open from a discharge outlet of the air pressure supply means to a low pressure zone in the cooking flame supply pipe adjacent the venturi tube; and f. means to control the ratio of gas to air delivered into the supply pipe.

16. The apparatus of claim 15 wherein said means for supplying the kindling flame tube with a gas-ari mixture includes means for utilizing the portion of the output of air from said air pressure supply means.

17. The apparatus of claim 16 wherein said means for utilizing a portion of the output of air from said air pressure supply means includes at least one bleed passageway open between said cooking flame tube and said kindling flame tube, said passageway being of size to permit said gas-air mixture in said cooking flame tube to establish and maintain a substantially lesser static pressure in said kindling flame tube than that in said cooking flame tube when said upper burner is in operation.

18. The apparatus of claim 15 wherein said air pressure supply means includes an air pump of a type that, when inoperative, has an open passage for air from an entrance opening through said discharge outlet.

19. The apparatus of claim 18 wherein said air pump is a centrifugal blower.

20. The apparatus of claim 19 wherein said means for supplying said kindling flame tube with a gas-air mixture includes:

a. a kindling gas supply line adapted to lead from a source of gas under pressure;

b. a kindling flame supply pipe open to said kindling flame tube;

c. a venturi tube on said kindling gas supply line and open into the kindling flame supply pipe;

d. an air tube open from a discharge outlet of the centrifugal air blower to a low pressure zone in the kindling flame supply pipe adjacent the venturi tube; and e. means to control the ratio of gas to air delivered into the kindling flame supply pipe.

21. The apparatus as specified in claim 20, an elongated, horizontal, upwardly delivering, lower gas burner located below said grill in parallel relation to said upper burners and equidistance from them; a lower burner gas supply line adapted to lead from a source of gas under pressure; and means to ignite said lower burner.

22. The apparatus of claim 21 and control means including:

a. normally closed upper burner valve means in the gas supply lines to said cooking flame tube and to said kindling flame tube;

b. a normally closed lower burner valve in the lower burner gas supply line;

c. an upper burner timer;

d. a lower burner timer, e. means including manually operable "Push to Start" switches operable to actuate said upper burner valve means, said lower burner valve, said means to reciprocate said grill, said centrifugal blower, and said ignition means;

f. said cooking flame timer being operative to deactivate said upper burner valve means when a predetermined time period has elapsed after activation;

g. said lower burner timer being operative to deactivate said lower burner valve when a predetermined time period has elapsed after activation; and h. means to deactivate said reciprocating means, said centrifugal blower and said ignition means upon deactivation of both said valves.

23. The apparatus of claim 22 wherein said upper burner timer and said lower burner timer are adjustable to permit the amount of time said upper burners direct heat toward said grill and the amount of time said lower burner provides heat under the grill to be selectively predetermined.

24. The apparatus of claim 23 wherein said upper burners are vertically adjustably mounted on the frame in relation to the grill; and said lower burner is vertically adjustably mounted on the frame in relation to the grill.

25. The apparatus of claim 3 wherein said means adapted to reciprocate said grill incudes:

a. a crane arm rotatbly mounted with respect to said frame;

b. power means for rotating said crank arm once for each desired cycle of grill reciprocation; and c. a grill drive linkage pivotally connected between said grill and said crank arm.

26. The apparatus of claim 25 and adjustable means for pivotally connecting said linkage to said crank arm at different distances from the center of rotation of the crank arm to afford different lengths of reciprocation by the grill to accommodate different lengths of food portions.

27. The apparatus of claim 26 wherein said means adapted to cause uniform heat input is constituted as means for speeding up the speed of rotation of the crank arm as that arm moves the grill through outer end portions of its movement.

28. An apparatus for broiling a portion of food while positioned on a platter having an upstanding, juice-retaining lip around the outer periphery thereof, said apparatus including a frame; an elongated, horizontal, downwardly delivering, upper heat source having at least one elongated horizontal downwardly delivering heater; a grill adapted to support below said upper heat source a platter with an upstanding lip, and, on it, a food portion to be broiled; means adapted to reciprocate said grill with respect to said frame in a horizontal plane beneath said heat source and transversely of the longitudinal axis thereof in a manner to repeatedly bring all areas of a food portion on a platter on said grill into and out of vertical alignment beneath said heat source.

29. The apparatus of claim 28 wherein the heat source includes at least two such horizontal upper heaters in spaced parallel relation to each other; and wherein there is means adapted to cause the heat input from said heat source to a food portion on a platter to be relatively even over the entire upper surface of said food portion; said means to cause even heat input including said means adapted to reciprocate said grill.

30. The apparatus of claim 27 wherein said upper heaters are each constituted as downwardly firing upper gas burners.

31. The apparatus of claim 30;

a. wherein said upper gas burners each include:
1. a cooking flame tube having vertical, downwardly opening cooking flame orifices therethrough; and
2. a kindling flame tube having downwardly opening kindling flame orifices therethrough;

b. said tubes being so arranged that said kindling flame orifices open to position immediately adjacent said cooking flame orifice openings;

c. means for supplying said cooking flame tube with a combustible gas-air mixture under a pressure in excess of that at which flames fed by said cooking flame mixture through said cooking flame orifices can be sustained adjacent the cooking flame tube; and d. means for supplying said kindling flame tube with a combustible gas-air mixture under a pressure such that flames fed by said kindling flame mixture through said kindling flame orifices will be stable and will kindle a cooking flame at each cooking flame orifice.

32. The apparatus of claim 31 and means to ignite kindling flames at each kindling flame orifice.

33. The apparatus of claim 32 wherein said means to ignite includes;

a. a pilot light;

b. said kindling flame tube being provided with a continuous longitudinal ribbon flame slot open from the interior of said tube to position adjacent the opening of each of said kindling flame orifices from said kindling flame tube; and c. a flash tube positioned to carry gas-air mixture from outside said slot to said pilot light and to carry flame from said pilot light to outside said slot.

* * * * *

UNITED STATES PATENT AND TRADEMARK OFFICE
CERTIFICATE OF CORRECTION

PATENT NO. : 3,943,910
DATED : March 16, 1976
INVENTOR(S) : Lyall B. White

It is certified that error appears in the above-identified patent and that said Letters Patent are hereby corrected as shown below:

Column 1, line 17, "aford" should be --afford--.

Column 2, line 45, "Fig. 4" should be --Fig. 1--.

Column 9, line 39, "lowr" should be --lower--.

Column 9, line 46, "substanially" should be --substantially--.

Column 11, line 4, "siad" should be --said--.

Column 12, line 11, "gas-ari" should be --gas-air--.

Column 13, line 20, "rotatbly" should be --rotatably--.

Signed and Sealed this twenty-fifth Day of May 1976

[SEAL]

Attest:

RUTH C. MASON
Attesting Officer

C. MARSHALL DANN
Commissioner of Patents and Trademarks